(12) United States Patent
Irving et al.

(10) Patent No.: US 12,722,793 B2
(45) Date of Patent: Sep. 1, 2026

(54) EXHAUST DUCT

(71) Applicant: BAE SYSTEMS plc, London (GB)

(72) Inventors: Jonathan Peter Irving, Warton (GB); Stephen Charles Nunn, Warton (GB); Colin Whaites, Warton (GB)

(73) Assignee: BAE SYSTEMS plc, London (GB)

( * ) Notice: Subject to any disclaimer, the term of this patent is extended or adjusted under 35 U.S.C. 154(b) by 2908 days.

(21) Appl. No.: 14/998,848

(22) Filed: Aug. 26, 2016

(65) Prior Publication Data

US 2024/0337382 A1 Oct. 10, 2024

(30) Foreign Application Priority Data

Aug. 28, 2015 (GB) .................................... 1515510

(51) Int. Cl.

*B64D 33/04* (2006.01)
*B64D 27/14* (2006.01)
*B64D 27/20* (2006.01)

(52) U.S. Cl.

CPC ............. *B64D 33/04* (2013.01); *B64D 27/14* (2013.01); *B64D 27/20* (2013.01)

(58) Field of Classification Search

CPC .. B64D 27/014; B64D 27/20; B64D 2633/04; B64D 2633/06; F02K 1/82; F02K 1/822; F02K 1/825; F02K 1/827; F02C 7/12; F02C 7/125; F02C 7/16; F02C 7/18; F01D 25/26

See application file for complete search history.

(56) References Cited

U.S. PATENT DOCUMENTS 2,631,796 A * 3/1953 Williamson, Jr. ........ F02C 7/12 244/74
2,940,692 A 6/1960 Kerry et al.
6,039,287 A 3/2000 Liston et al.
2004/0118972 A1 6/2004 Ouellette et al.
2009/0230213 A1* 9/2009 Harris ..................... B22F 3/225 239/265.35
2014/0030074 A1 1/2014 Roberge
2014/0208714 A1* 7/2014 Jones ........................ F02K 3/02 60/226.1

FOREIGN PATENT DOCUMENTS

EP 0 849 165 A2 6/1998
GB 1 135100 11/1968
WO WO/2006/034461 3/2006

OTHER PUBLICATIONS

GB Search Report dated May 13, 2016 from related GB Patent Application GB 1515510.4.
GB Combined Search and Examination Report dated Jul. 12, 2017 from related GB Patent Application GB 1614262.2.

* cited by examiner

*Primary Examiner* — Nicholas McFall
(74) *Attorney, Agent, or Firm* — Scully, Scott, Murphy & Presser, P.C.

(57) ABSTRACT

A jet engine exhaust assembly 20 is disclosed. The exhaust assembly comprises a double-walled exhaust duct 22 comprising an inner wall defining the inner profile of the duct and an outer wall spaced apart from the outer surface of said inner wall to define a cooling space 21 therebetween. The double-walled exhaust duct 20 is a structural load bearing component.

30 Claims, 5 Drawing Sheets

EXHAUST DUCT

The present invention relates to an exhaust duct for a jet engine. Particularly, but not exclusively the invention relates to an exhaust duct comprising a jet-pipe and nozzle.

Military and civil vehicles, particularly air vehicles, can encounter a hostile threat and attack from threats such as Infrared (IR) missiles, which may potentially result in the loss of the vehicle. In particular the rear aspect of the vehicle is especially vulnerable from an IR missile attack. This is mainly due to IR emissions from the jet pipe/nozzle and/or engine exhaust plume all of which tend to be at relatively high temperatures. Generally, the magnitude of IR emissions is strongly affected by the temperature of the emitting surface.

One approach to minimising such IR emissions is to design the exhaust assembly (comprising for example a jet pipe and nozzle) to reduce observability. For example, at least a portion of exhaust assembly may have a complex profile for example a non-axisymmetric profile to reduce the signature of the jet pipe/nozzle and/or engine exhaust plume and/or to mask the engine core from the nozzle outlet. The increased complexity of such arrangements may present difficulties in integration and support of the exhaust assembly within the vehicle.

According to a first aspect there is provided a jet engine exhaust assembly comprising:

- a double-walled exhaust duct comprising an inner wall defining the inner profile of the duct and an outer wall spaced apart from the outer surface of said inner wall to define a cooling space therebetween; and wherein
- the double walled exhaust duct is a structural load bearing component.

The exhaust duct may be arranged to bear primary structural loads of the vehicle. The applicant has recognised that by providing an exhaust duct which incorporates a cooling space it is possible to reduce the range of temperature variation of the exhaust assembly during use. For example the temperature may be constrained within a predetermined operating range which limits thermal movement of the exhaust and/or maintains the strength of the exhaust. As such, the exhaust duct may be integrated into the surrounding structure as a load bearing component.

This is in contrast to existing arrangements in which the exhaust duct is generally suspended within the rear fuselage section of the aircraft with only limited points of connection via joints which allow movement to accommodate expansion and contraction of the exhaust duct during use.

Advantageously, this may enable the overall structure to be reduced in size, weight and/or complexity. A further advantage of embodiments of the invention may be the avoidance of the need to provide a removal path for the exhaust duct. In some embodiments it may be possible to provide a substantially continuous or unbroken skin around the structure surrounding the exhaust assembly (thereby providing further opportunity to increase structural efficiency.

Embodiments of the invention may provide a fuselage structure comprising a frame work and a jet engine exhaust assembly in accordance with the invention, wherein the exhaust assembly is structurally connected to the frame work. In other words the exhaust assembly may form an integral part of the fuselage structure (for example providing a load path through the framework).

The frame work comprises at least one aperture arranged to receive the jet exhaust assembly and wherein aperture is configured to structurally engage the exhaust assembly. The, or each, aperture may substantially surround the exhaust assembly.

The frame work may comprise at least one web (for example a shear web) and the at least one aperture is defined within said web. The, or each, aperture may be a closed aperture (for example the shear web may be substantially unbroken/uninterrupted).

The frame work may include a plurality of spaced apart webs. Each web may include one aperture arranged to receive (and engage) a portion of the jet exhaust.

The, or each, web may extend in a plane which is substantially perpendicular to the longitudinal axis of the jet exhaust.

The fuselage structure may further comprise a fuselage skin supported by the frame work. Typically, the structure may comprise an upper and lower skin. The skins may be load bearing. The skins may define the outer aerodynamic profile of the vehicle.

The exhaust duct may comprise a jet pipe and/or nozzle. The exhaust duct comprises a non-axisymmetric nozzle. Such nozzles may also be known as a 2-D nozzle. The exhaust duct may further comprise a jet pipe which is at least partially axisymmetric. The exhaust duct further comprises a transition jet pipe disposed between the axisymmetric jet pipe portion and the non-axisymmetric nozzle. The invention may be particularly useful in application to such complex profiled exhaust ducts since they may present additional difficulties in integrating the exhaust duct into the aircraft structure.

The exhaust duct may be formed of a plurality of discrete sections.

At least two of a plurality of discrete exhaust duct sections may be connected at a circumferential, or part circumferential, interface. In other words, the exhaust duct may be segmented along its length. For example the nozzle, axisymmetric and transition sections may be discrete and interconnected At least two of a plurality of discrete exhaust duct sections may be connected at a longitudinal interface. In other words, the exhaust duct may be segmented into radial segments. For example, the exhaust duct may be split into two portions each defining half of the cross sectional profile of the duct.

The cooling space in each section may be independently connected to the cooling apparatus. For example the sections could be provided with their own inlet and outlet (for example a dedicated inlet and/or outlet manifold). Such sections could be connected in parallel or series depending upon the cooling required in each section.

Alternatively, sections of the exhaust duct may define a single cooling space. For example a single annular or circumferential space which surrounds the whole duct section or a single space extending along the length of the duct.

In principle a single cooling space may be desirable, for example to avoid non-cooled regions between separate cooling spaces. However, a segmented cooling space may provide the designer with greater control over localised cooling (for example at hot spots due to the configuration of the exhaust or engine). Thus, it will be appreciated that the most suitable configuration may depend upon the particular application and could be chosen taking into account factors such as the particular engine and duct configuration, the operation temperatures, the engine bypass ratio and uncooled jet pipe conditions.

Embodiments of the invention may typically further comprise a cooling apparatus arranged to supply cooling fluid into the cooling space. The cooling apparatus may be arranged to provide a controllable level of cooling. The cooling apparatus may be arranged to provide cooling independently of the output of the propulsion unit. The cooling apparatus may be arranged to actively restrict the temperature of the exhaust assembly to within a predetermined range for example to maintain structural strength and/or control thermal expansion.

The cooling apparatus is arranged to provide cooling fluid into the space, such that, in use, the exhaust duct is cooled by heat transfer to the cooling fluid within the space by the cooling fluid absorbing heat and/or by the cooling fluid being converted into gas or vapour.

The cooling apparatus may comprise a pump for providing cooling fluid into the space. The pump may provide a flow of cooling fluid to the space via an inlet (or a plurality of inlets where the space is segmented). The, or each, inlet may include a feed manifold. Such a feed manifold may be arranged to provide, in use, a distributed supply path for cooling fluid into the space. For example the feed manifold may be configured to avoid regions of possible stagnation and/or perturbed flow within the pressurised space.

The cooling apparatus may further comprise an outlet for returning fluid and/or vapour from the space (or a plurality of outlets where the space is segmented). The, or each, outlet may include a return manifold. Such a return manifold may be arranged to provide, in use, a distributed return path for cooling fluid/vapour from the space. For example the return manifold may be configured to avoid regions of possible stagnation and/or perturbed flow within the pressurised space.

The, or each, inlet and/or outlet may be integrated into the frame work of the fuselage structure (for example by bores extending through the framework). Such an arrangement is possible in embodiments of the invention as the connection between the exhaust duct and the pipe is generally rigid. Advantageously this may allow other pipework to be positioned remotely from the exhaust structure.

The cooling apparatus may further comprise a vapour/fluid separator. The separator may be arranged, in use, to separate vapour and fluid produced within the space (by heat transfer to the cooling fluid). The separator may receive mixed vapour/fluid from the space (for example from the outlet of the space). The separator may comprise a collector tank.

The cooling apparatus may be arranged as a pressurised loop. The pressurised loop may comprise the device for providing cooling fluid (for example the pump), the cooling space and the separator. In use, cooling fluid from the fluid/vapour separator may be recirculated to the pressurised space. Vapour from the fluid/vapour separator may be exhausted from the pressurised loop. The cooling system may further comprise a reservoir for replenishment of the cooling fluid. The reservoir may be outside of the pressurised loop.

The cooling apparatus may comprise at least one control valve, for example a pressure or flow control valve. For example a control valve may be provided on the feed for the cooling space. Additionally or alternatively, a control valve may be provided on the return from the cooling space.

A cooling apparatus controller may be arranged to control one or more of: the rate of flow of cooling fluid through the space; the pressure of the cooling fluid in the space and/or the exhaust of vapour from the cooling apparatus.

The cooling apparatus may comprise a vapour exhaust associated with the vehicle propulsion unit nozzle or jet pipe. The vapour exhaust may be arranged to add vapour to the exhaust of the vehicle propulsion unit (for example in the jet pipe). The vapour may be added to the exhaust plume of the vehicle propulsion unit. This may act to cool the exhaust plume and reduce the IR signal thereof. Additionally or alternatively, the vapour exhaust may be arranged to direct vapour at the exhaust flow proximal to the nozzle throat. This may act to create a disturbance that enhances jet-freestream mixing so as to enhance the cooling rate of the exhaust plume.

According to a further aspect of the invention there is provided an aircraft, comprising a propulsion unit and a fuselage structure or jet exhaust assembly as claimed in accordance with an embodiment of the invention. The vehicle may comprise an unmanned air vehicle.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to the skilled person. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
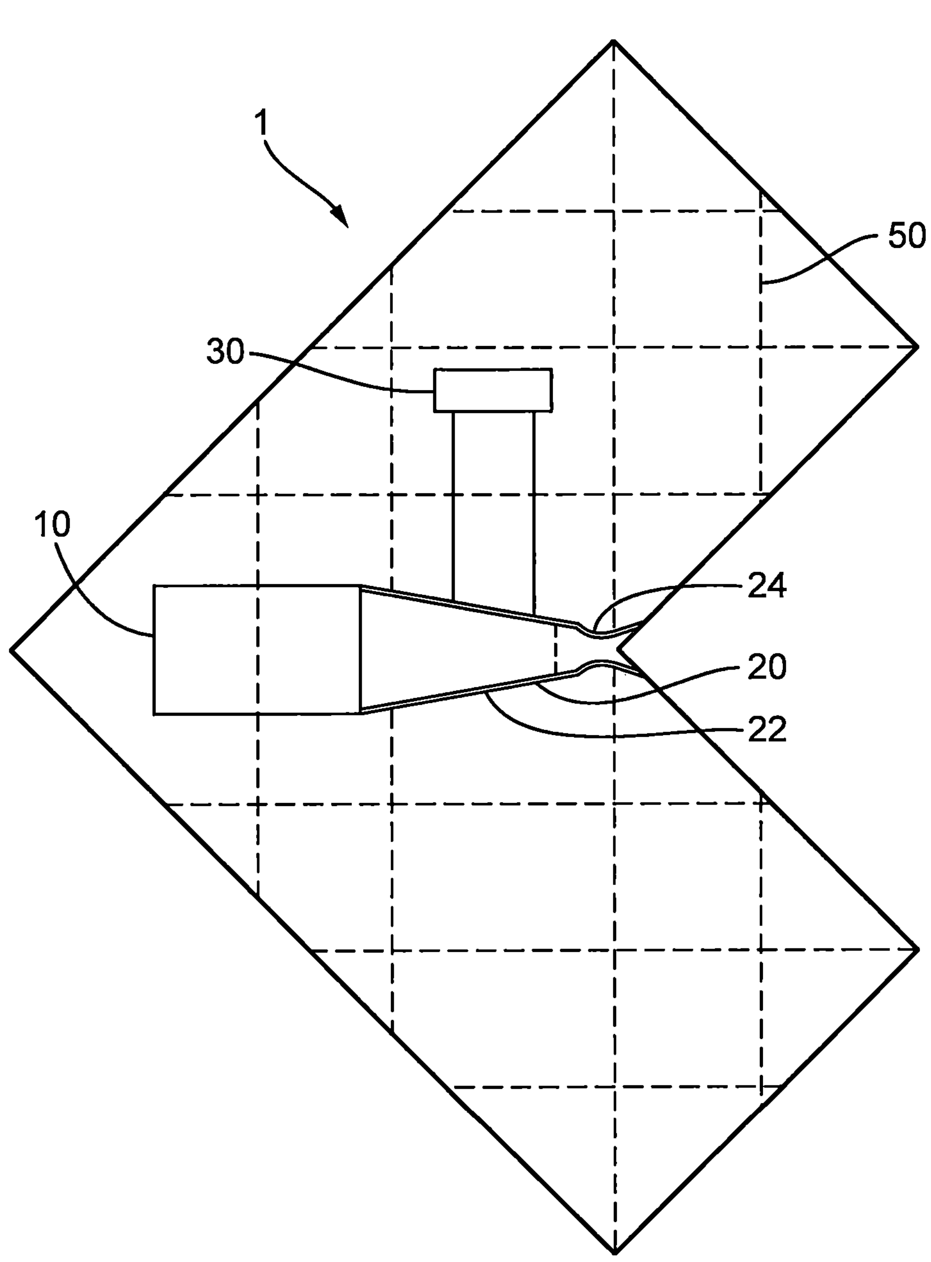
FIG. 1 is a schematic drawing of an aircraft with a jet engine and an exhaust assembly in accordance with an embodiment.

An aircraft 1, which may for example be an unmanned air vehicle (UAV), is represented schematically in FIG. 1. The aircraft has at least one engine 10 which will generally be a jet engine. In the context of the invention it will be appreciated that the term jet engine is used broadly and may, for example include turbojets, turbofans, turboprops, rockets, ramjets and pulse jets. The aircraft includes an exhaust assembly 20 downstream of the engine 10. The exhaust assembly 20 include a nozzle 24 and a jet pipe 22. It will be appreciated that the nozzle 24 and jet pipe 22 are the principle components of a typical exhaust assembly 20 of a jet engine 10. The nozzle 24 is generally the final portion of the exhaust assembly 20. The nozzle 24 typically includes a convergent throat. The jet pipe 22 generally extends between the engine core and the nozzle 24. The aircraft 1 also includes a structure 50 which is typically formed of a series of a frame work (shown schematically by the hashed markings) which supports outer skin panels.

Both the jet pipe 22 and nozzle 24 of the exhaust duct 22 are formed with a double walled construction such that a cooling space 21 for receiving cooling fluid may be defined. A cooling apparatus 30 is provided for providing cooling fluid to the cooling space 21 during use. The cooling space 21 at least partially (and typically substantially) surrounds the exterior surface of the wall defining the exhaust assembly 20. It will be appreciated that, in use, the inner surface of the inner wall (i.e. the surface which defines the boundary of the exhaust duct) is exposed to exhaust flows from the engine 10. The cooling space 21 is arranged to enable direct cooling of the (inner) wall via its exterior surface by the transfer of heat from the wall to cooling fluid located within the cooling space 21. It will be appreciated that an advantage of cooling the exterior surface of the wall which defines the exhaust duct is that the cooling apparatus minimises or avoids disruption to the engine exhaust flows (and therefore minimises or reduces any impact on engine performance).

Figure 2:
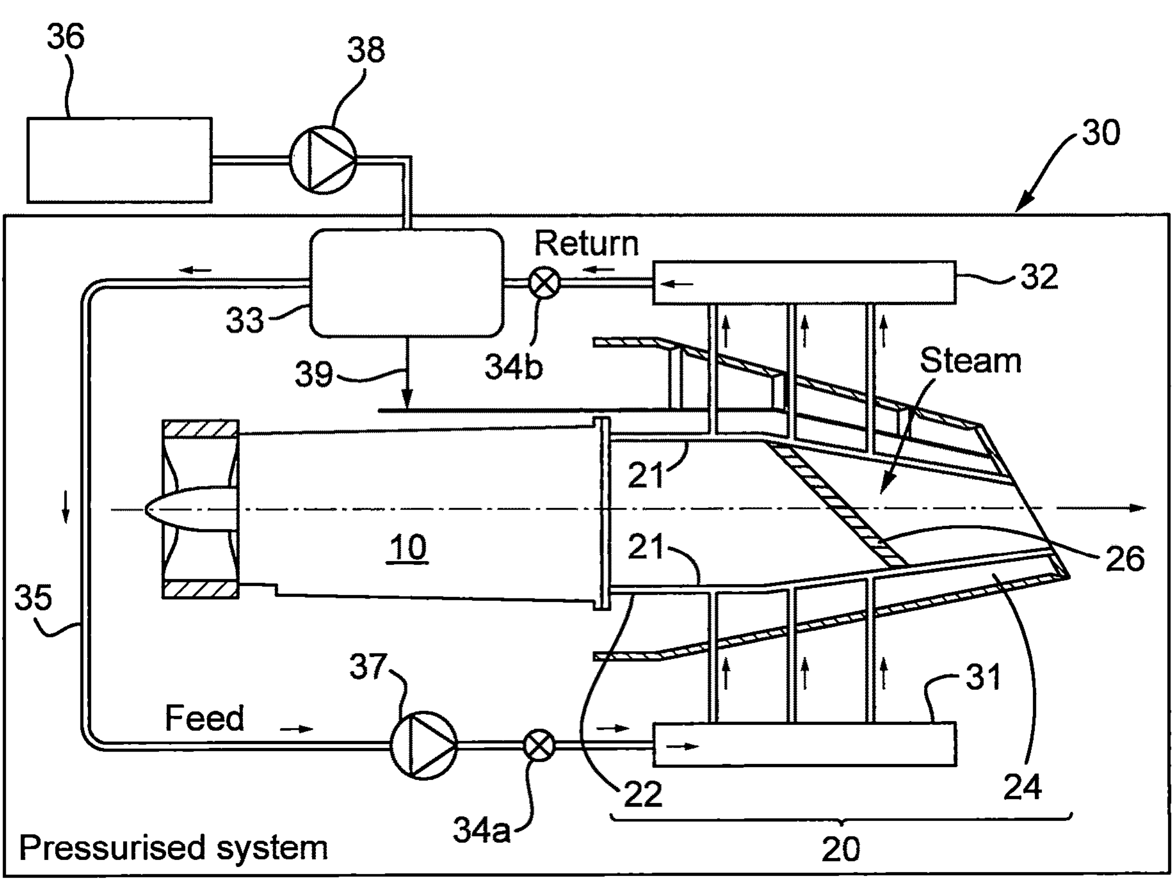
FIG. 2 is a schematic drawing of the cooling apparatus associated with the exhaust assembly according to an embodiment.

The cooling apparatus 30 is arranged to cool the exhaust assembly 20 of the aircraft 1 and is shown in more detail in FIG. 2. The cooling apparatus 30 is arranged as a closed loop pressurised system such that the cooling fluid in the cooling space 21 may be maintained at pressure. Cooling fluid is provided to the cooling space 21 via an inlet or feed manifold 31 and subsequently returned (typically as a mixture of fluid and vapour) from the cooling space 21 via a return manifold 32. It will be appreciated that the particular arrangement of the feed 31 and return 32 manifolds and cooling space 21 (for example the flow path within the space) will be dependent upon the particular architecture of the aircraft and/or engine. However, the configuration should be optimised to avoid regions of possible stagnation and/or perturbed flow within the pressurised cooling space 21.

Cooling fluid entering the cooling space 21 via the feed manifold 32 is controlled using a pump 37 and an inlet control valve 34*a* (each of which may be controlled by the cooling controller 42). A further control valve 34*b* may be provided on the return line for fluid/vapour returning from the cooling space 21 via the return manifold 32. A collector tank 33 is provided within the pressurised loop of the cooling apparatus 30 and provides cooling fluid to the pump 37 of the inlet via a line 35.

The collector tank 33 also acts as a fluid/vapour separator in use by receiving mixed fluid and vapour from the return 32 and feeding only fluid back to the feed line 35. Vapour from the collector tank 33 (which has not condensed back into liquid) may be removed from the system via a vapour exhaust 39. In the illustrated embodiment the vapour exhaust line 39 directs the vapour to a grid 26 located in the flow of the exhaust gas within the exhaust assembly 20. A bullet may be used in place of or in addition to the grid and is another known means of masking the engine core. Alternatively or additionally, the vapour exhaust line 39 may be directed to cool other surfaces or to mix with or mask the exhaust plume. For example, the control system may be able to selectively divert the vapour exhaust depending upon the mode of operation and threat level. A regulator valve (not shown) may be provided in the vapour exhaust line 39 to maintain the closed loop system pressure.

In order to replenish cooling fluid levels within the pressurised system (due to the consumption of cooling fluid resulting from the vapour exhaust), a reservoir 36 is provided and arranged to feed cooling fluid to the collector tank 33 using a pump 38. The reservoir 36 is typically unpressurised (i.e. it is not part of the closed loop pressurised system).

The basic operation of the cooling system 30 will now be described. In a normal operating mode the pump 37 is activated and transfers cooling fluid under pressure from the collector tank 33 to the cooling space 21. The feed manifold 31 ensures that the incoming fluid is suitably distributed about the cooling space 21. The controller 42 (not shown) controls the flow rate and pressure through the space 21 using the pump 37 and pressure/flow valves 34*a* and 34*b*. Heat from the exhaust gasses within the exhaust assembly 20 transfers through the wall to the cooling fluid within the space 21. In the normal operating mode the pressure within the space 21 (and therefore the closed loop of the pressurised system) is maintained at a level which is slightly higher than the pressure in the exhaust assembly 20 at the location of the outlet from the vapour exhaust 39 (to ensure that the vapour will exhaust into the flow).

As a result of the heat transfer, the temperature of the cooling fluid within the pressurised space 21 will increase. The system is controlled such that cooling fluid in the circuit is typically allowed to warm up to near boiling point. As such the cooling fluid within the space is allowed to boil at the surface of the wall (although it will be appreciated that such boiling may be localised due to non-uniform heat distribution within the exhaust duct and flow patterns through the space 21). Heated cooling fluid flows from the cooling space 21 via the return manifold 32 and is at this stage may typically be mixed vapour and fluid. The vapour and fluid is transferred to the collector tank 33 which allows the vapour (in the form of steam) to be separated and exhausted via the vapour exhaust line 39. The fluid recirculates from the collector tank 33 to the pump 37 via a return line 35. As a result of the vapour exhaust, cooling fluid (and primarily water from the cooling fluid) is consumed during operation. As such, water may be replenished, for example, into the collector tank 33 as required from an unpressurised reservoir 36.

Figure 3A:
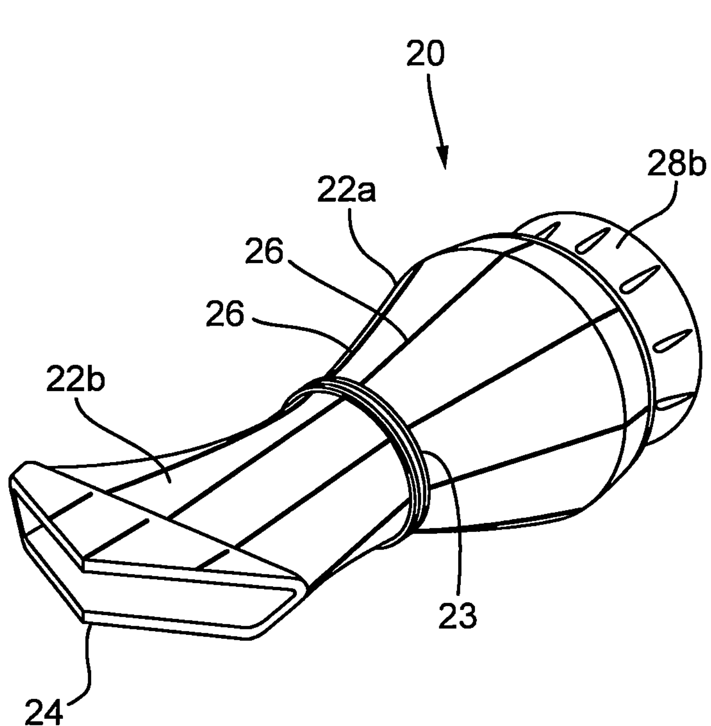
FIG. 3 is a schematic drawing of an exhaust duct for use in an embodiment.
Figure 3B:
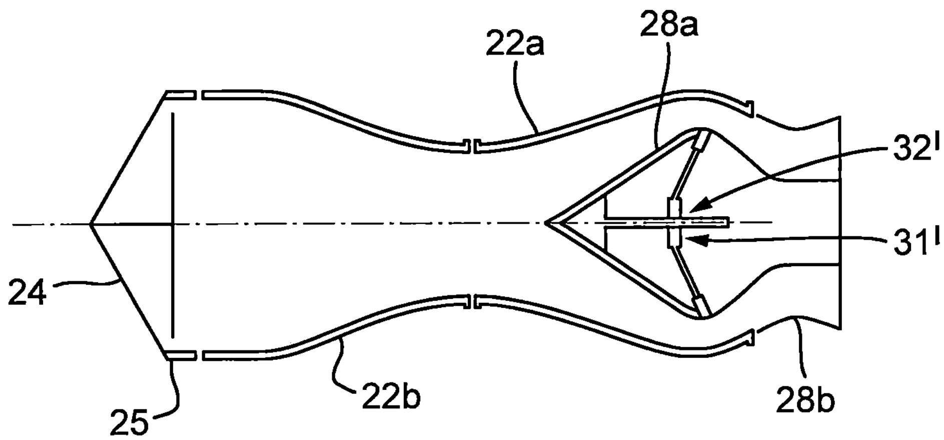

As shown in FIG. 3, the exhaust duct 20 may include an non-axisymmetric nozzle 24, a jet pipe 22 and a bullet 28, each of which are at least partially formed with a double walled construction. FIG. 3*a* shows an external three dimensional perspective view of the exhaust duct 20, whilst FIG. 3*b* shows a cross section through the exhaust duct 20.

The jet pipe 22 includes a first axisymmetric section 22*a* (proximal to the engine 10) and a non-axisymmetric transition section 22*b* (proximal to the nozzle 24). The sections 22*a* and 22*b* of the jet pipe 22 may be separately formed and connect at an interface flange 23. It will additionally be noted that the jet pipe 22 may also have a series of channels defined along its length by partitions 26 (which may or may not be split lines between separately manufactured sections of the jet pipe).

As best seen in FIG. 3*b* the bullet 28 includes a support section 28*b* and a functional body section 28*a* positioned within the jet pipe 22. In the illustrated embodiment only the section 28*a* is provided with a double walled construction and the support section 28*b* is uncooled. An inlet 31' and outlet 32' for cooling fluid is provided for the double walled section of the bullet 28*a*. It will be appreciated that as the bullet 28 is internal to the jet pipe 22, its cooling is primarily for IR signature control reasons rather than for structural reasons.

Figure 4A:
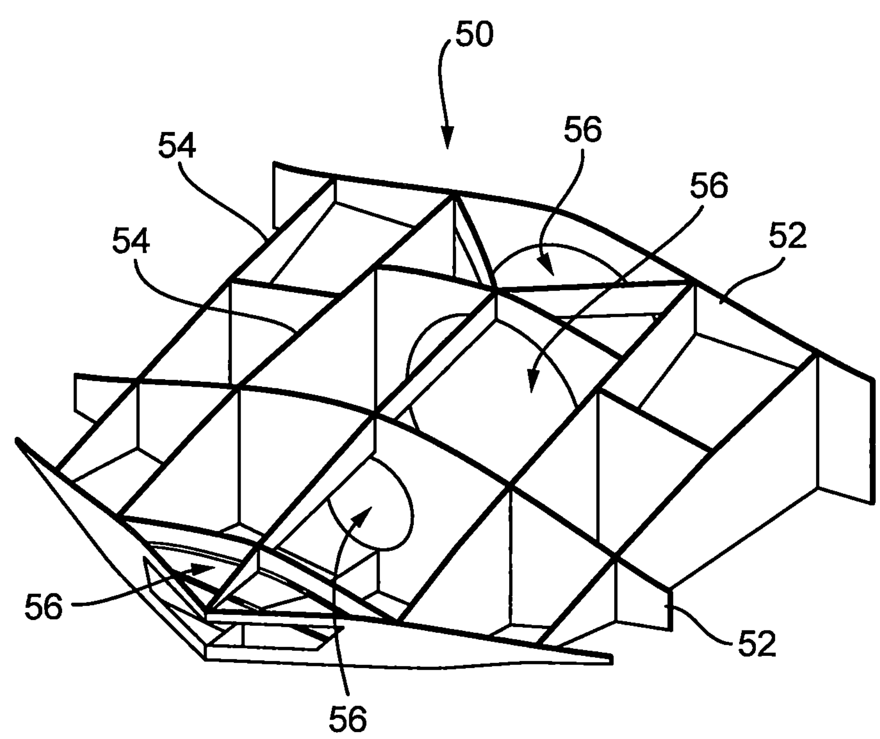
FIG. 4 is a schematic of a fuselage framework in accordance with an embodiment.

A typical support frame work for use in an embodiment of the invention is shown in FIG. 4. The frame work comprises a plurality of shear webs 52 which are generally aligned with the lateral axis of the aircraft (i.e. they extend in a direction substantially perpendicular to the longitudinal axis of the engine 10 and exhaust duct 20). A further plurality of shear webs 54 are generally aligned with the longitudinal axis of the aircraft (i.e. they extend in a direction substantially parallel to the longitudinal axis of the engine 10 and exhaust duct 20).

The lateral shear webs 52 are provided with closed aperture cut outs 56 which match the local profile of the exhaust duct 20. These apertures 56 allow the exhaust 20 to be structurally connected into the frame 50 such that the primary aircraft loads may be shared between the frame 50 and exhaust 20. As the shear webs 52 are unbroken the structural efficiency of the frame 50 is increased.

Figure 4B:
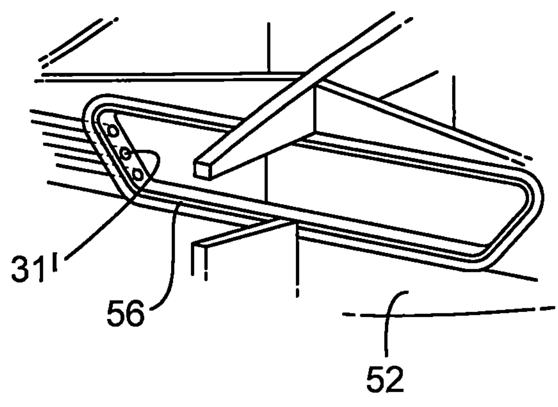

As shown in FIG. 4*b* (showing a close up section of the shear web proximal to the nozzle 24) ducting may be provided through the shear web 56 so as to provide an inlet 31' at the aperture 56 for providing cooling fluid to the exhaust duct 20. A similar outlet (not shown) may also typically be provided on the opposing portion of the aperture 56. Such integration of systems into the structure may reduce complexity and part-count of the system.

Figure 5:
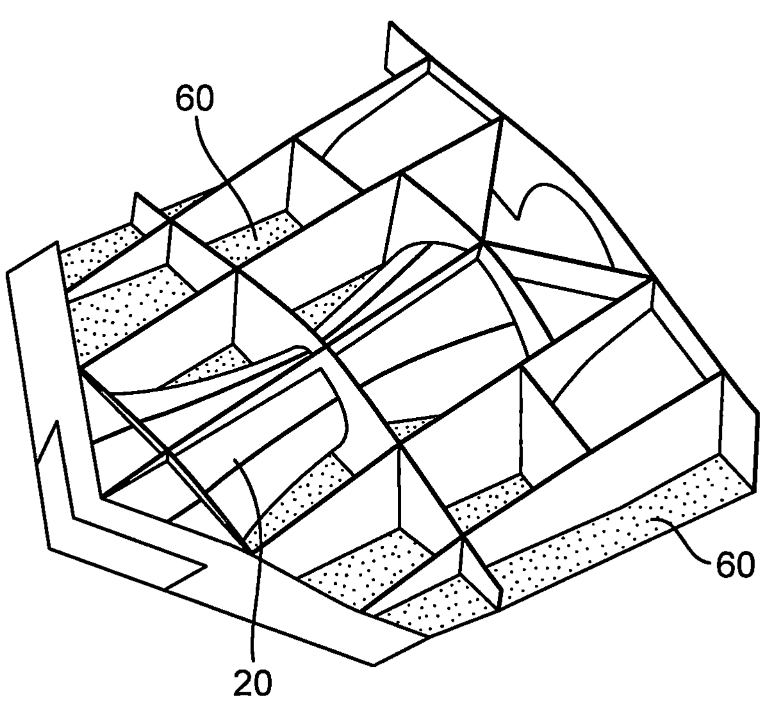
FIG. 5 is a schematic of a fuselage structure in accordance with an embodiment.

FIG. 5 shows the aircraft structure of FIG. 4 with the exhaust duct 20. It will be noted that the frame work 50 is covered by a skin 60 having a substantially unbroken surface. This provides further benefits to the structural efficiency of an aircraft in accordance with an embodiment.

While the invention has been described above with reference to a preferred embodiment, it will be appreciated that various changes or modifications may be made without departing from the scope of the inventions as defined in the appended claims.

For example, it be appreciated that the apparatus is scalable and can be incorporated into vehicles having several (identical or different in design) propulsion-related components that will benefit from cooling. Although the examples described above show the casing being fitted around a pressure vessel/jet pipe, it will be understood that the casing could beneficially be fitted to other vehicle propulsion-related components, including exhausts of air vehicles, ground vehicles and marine vehicles.

The invention claimed is:

1. A jet engine exhaust assembly comprising:

a double-walled exhaust duct, the double-walled exhaust duct comprising an inner wall defining the inner profile of the duct and an outer wall spaced apart from the outer surface of said inner wall to define a cooling space therebetween; and wherein the double-walled exhaust duct is a structural load bearing component; and a cooling apparatus configured and arranged to provide cooling fluid into the cooling space, the cooling apparatus comprising a pump and a feed inlet.

2. A fuselage structure comprising a frame work and the jet engine exhaust assembly as claimed in claim 1, wherein the jet engine exhaust assembly is structurally connected to the frame work.

3. The fuselage structure as claimed in claim 2, wherein the frame work comprises at least one aperture arranged to receive the jet engine exhaust assembly and wherein the at least one aperture is configured to structurally engage the jet engine exhaust assembly.

4. The fuselage structure as claimed in claim 3, wherein the frame work comprises at least one web and the at least one aperture is defined within said at least one web.

5. The fuselage structure as claimed in claim 4, wherein the, or each, web extends in a plane which is substantially perpendicular to the longitudinal axis of the jet engine exhaust assembly.

6. The fuselage structure as claimed in claim 3, wherein the at least one aperture is a closed aperture.

7. The fuselage structure as claimed in claim 3, wherein the frame work includes a plurality of spaced apart webs, each web having one aperture arranged to receive the jet engine exhaust assembly.

8. The fuselage structure as claimed in claim 2, further comprising a fuselage skin supported by the frame work.

9. The jet engine exhaust assembly as claimed claim 1, wherein the double-walled exhaust duct comprises a jet pipe and/or nozzle.

10. The jet engine exhaust assembly as claimed in claim 1, wherein the double-walled exhaust duct comprises a non-axisymmetric nozzle.

11. The jet engine exhaust assembly as claimed in claim 10, wherein the double-wall exhaust duct further comprises an axisymmetric jet pipe.

12. The jet engine exhaust assembly as claimed in claim 11, wherein the double-walled exhaust duct further comprises a transition jet pipe disposed between the axisymmetric jet pipe and a non axisymmetric nozzle.

13. The jet engine exhaust assembly as claimed in claim 1, wherein the double-walled exhaust duct is formed of a plurality of discrete sections.

14. The jet engine exhaust assembly as claimed in claim 13, wherein at least two of the plurality of discrete sections are connected at a circumferential, or part circumferential, interface.

15. The jet engine exhaust assembly as claimed in claim 14, wherein the cooling space in each section are independently connected to the cooling apparatus.

16. The jet engine exhaust assembly as claimed in claim 14, wherein the sections define a single cooling space.

17. The jet engine exhaust assembly as claimed in claim 13, wherein at least two of the plurality of discrete sections are connected at a longitudinal interface.

18. The jet engine exhaust assembly as claimed in claim 1, wherein the cooling apparatus is arranged to provide a controllable level of cooling.

19. The jet engine exhaust assembly as claimed in claim 1, wherein the double-walled exhaust duct is cooled by heat transfer to the cooling fluid within the cooling space by the cooling fluid absorbing heat and/or by the cooling fluid being converted into gas or vapour.

20. The jet engine exhaust assembly as claimed in claim 1, wherein the cooling apparatus further comprises an outlet for returning fluid and/or vapour from the cooling space.

21. The jet engine exhaust assembly as claimed in claim 1, wherein the feed inlet and/or an outlet are integrated into a frame work of an fuselage structure.

22. The jet engine exhaust assembly as claimed in claim 1, wherein the cooling apparatus further comprises a vapour/fluid separator configured to separate vapour and fluid produced in the cooling space.

23. The jet engine exhaust assembly as claimed in claim 22, wherein the cooling apparatus is arranged as a pressurised loop, the cooling apparatus is configured such that the cooling fluid from the fluid/vapour separator is recirculated to the cooling space.

24. The jet engine exhaust assembly as claimed in claim 23, wherein vapour from the fluid/vapour separator is exhausted from the pressurised loop and the cooling apparatus further comprises a reservoir for replenishment of the cooling fluid.

25. The jet engine exhaust assembly as claimed in claim 1, wherein the cooling apparatus comprises at least one pressure control valve.

26. The jet engine exhaust assembly as claimed in claim 1, wherein the cooling apparatus further comprises a controller arranged to control at least one of the rate of flow of the cooling fluid through the cooling space, the pressure of the cooling fluid in the cooling space or the exhaust of vapour from the cooling apparatus.

27. The jet engine exhaust assembly as claimed in claim 1, wherein the cooling apparatus comprises a vapour exhaust associated with the double-walled exhaust duct.

28. An aircraft comprising the jet engine exhaust assembly as claimed in claim 1.

29. An unmanned air vehicle comprising the jet exhaust assembly as claimed in claim 1.

30. A jet engine exhaust assembly comprising a double-walled exhaust duct, the double-walled exhaust duct comprising an inner wall defining the inner profile of the duct and an outer wall spaced apart from the outer surface of said inner wall to define a cooling space therebetween; and wherein the double-walled exhaust duct is a structural load bearing component and the double-walled exhaust duct is formed of a plurality of discrete sections, and wherein the cooling space in each section are independently connected to a cooling apparatus.

* * * * *